United States Patent [19]
Serata

[11] 3,796,091
[45] Mar. 12, 1974

[54] BOREHOLE STRESS-PROPERTY MEASURING SYSTEM

[76] Inventor: Shosei Serata, 14 Calvin Ct., Orinda, Calif. 94563

[22] Filed: Oct. 2, 1972

[21] Appl. No.: 294,431

[52] U.S. Cl. ................................................ 73/88 E
[51] Int. Cl. .............................................. G01b 7/24
[58] Field of Search ............. 73/88 E, 84; 33/178 F

[56] References Cited
UNITED STATES PATENTS
3,364,737  1/1968  Comes ............................. 73/84 X
FOREIGN PATENTS OR APPLICATIONS
1,298,479  7/1969  Germany ........................... 73/88 E Primary Examiner—Charles A. Ruehl
Attorney, Agent, or Firm—Harris Zimmerman

[57] ABSTRACT

A stress-property measuring system for in situ determination of stress states and material properties of soil and rock media into which the apparatus is disposed via a borehole. The apparatus used in carrying out the instant method comprises two axially-aligned cylindrical chambers. The first of said chambers is capable of exerting fluid pressure in a transaxial direction relative to the chamber and normal to the inner cylindrical surface of said borehole; the second of said chambers is completely unpressurized and pressure-insulated from said first chamber. Both chambers are fitted with a plurality of sets of diameter-measuring transducers for measuring changes in borehole diameter at a number of points in one diametrical direction along the borehole longitudinal cylindrical axis. Using this measuring device, stress state and material properties of surrounding ground medium may be determined as follows. Fluid pressure is introduced into said first pressurized chamber, and is varied through a gradient of ever-increasing pressures up to a predetermined pressure limit. These ever increasing pressurizations cause corresponding incremental changes in borehole diameters in various radial directions in both the pressurized and non-pressurized sections of said borehole, the magnitude of such changes being determined by the stress conditions and material properties of the surrounding medium. By measuring the diameter change indicated by said diameter-measuring transducers, sufficient and accurate data may be collected to enable computation of the various in situ stress states and material properties of the ground medium.

12 Claims, 10 Drawing Figures

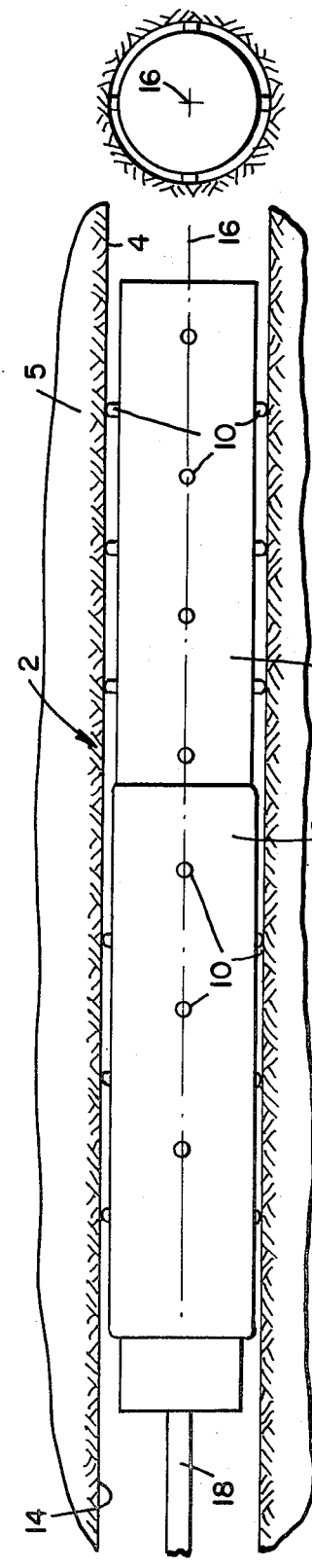
FIG_2
FIG_1
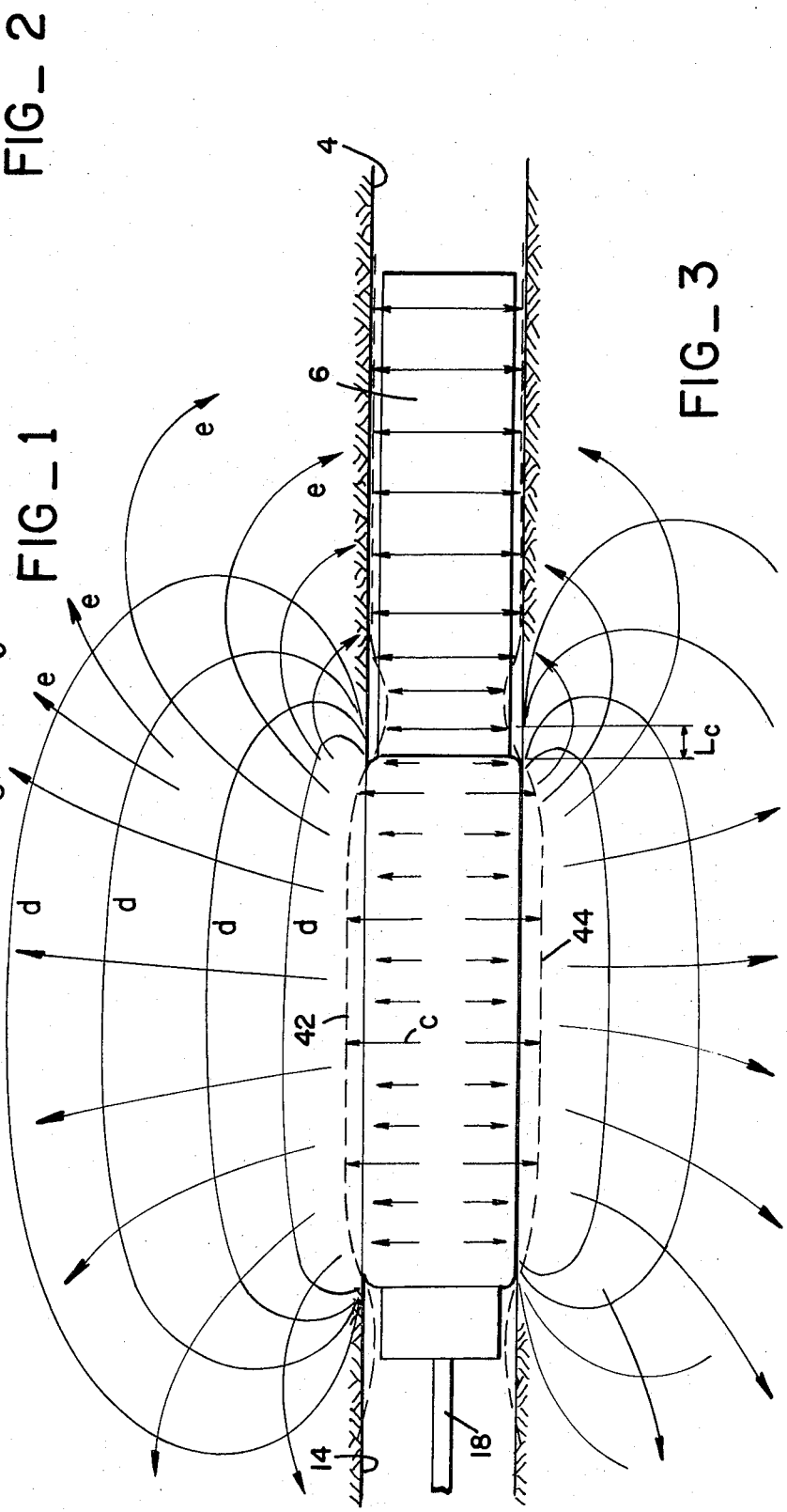
FIG_3

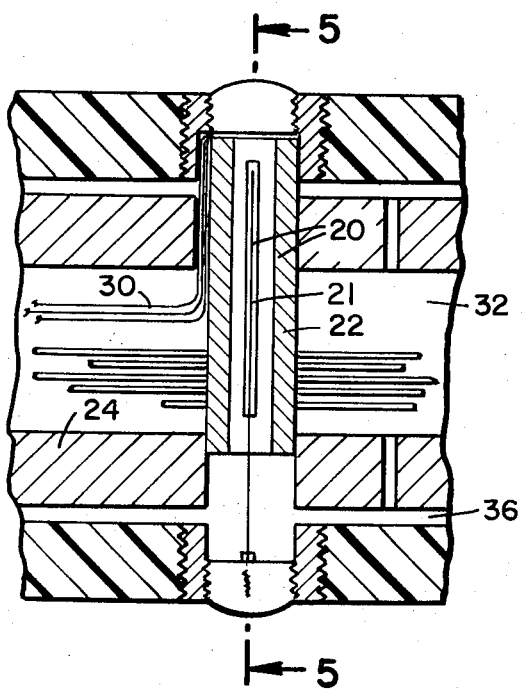
FIG_4
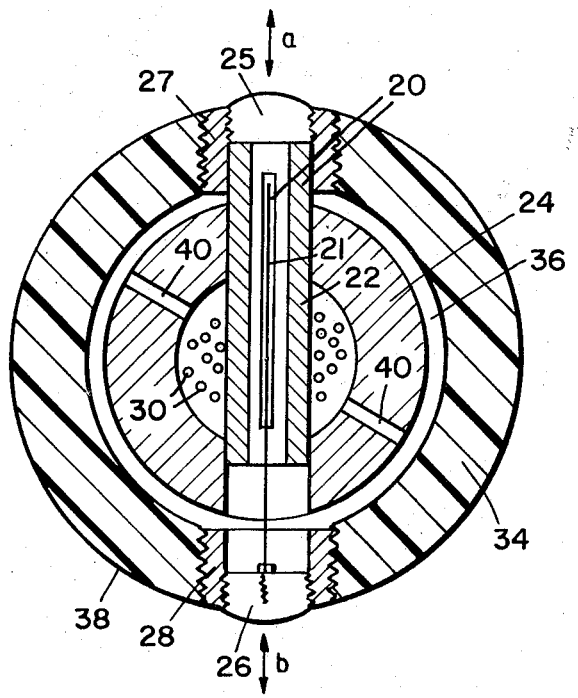
FIG_5
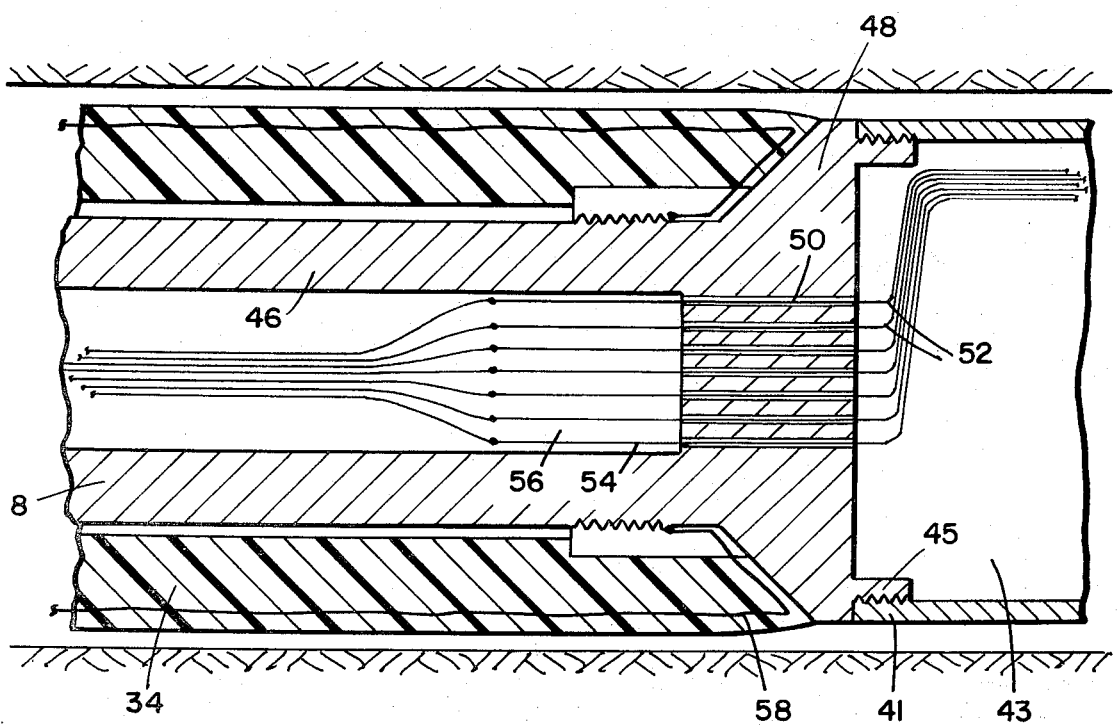
FIG_6

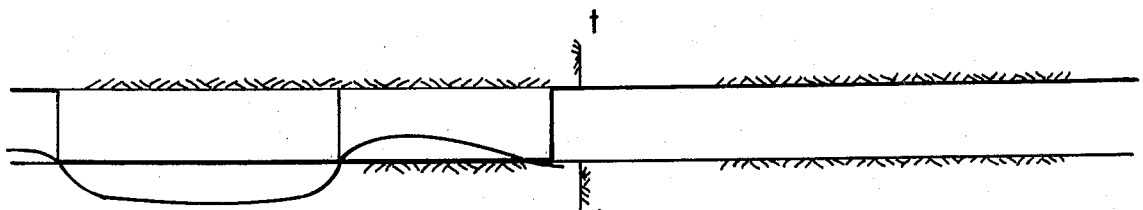
FIG_7
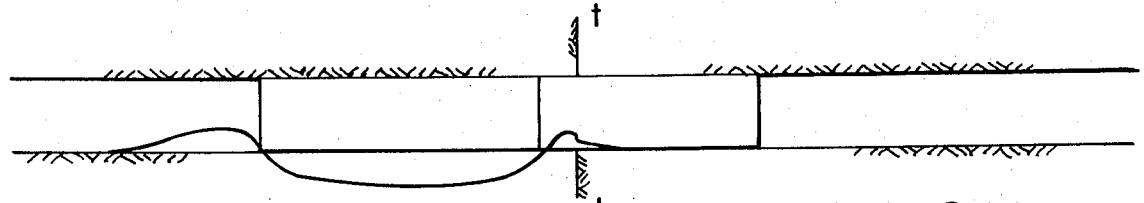
FIG_8
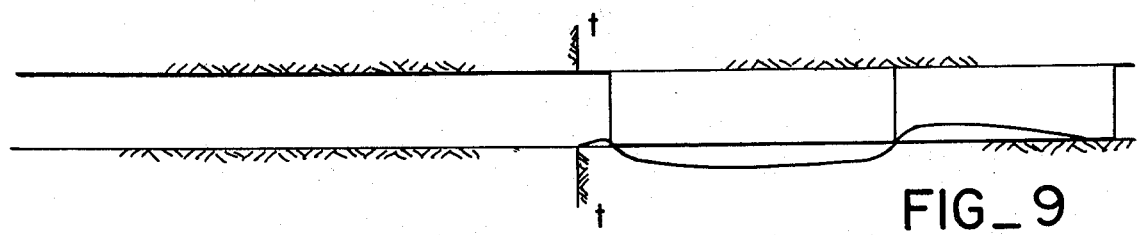
FIG_9
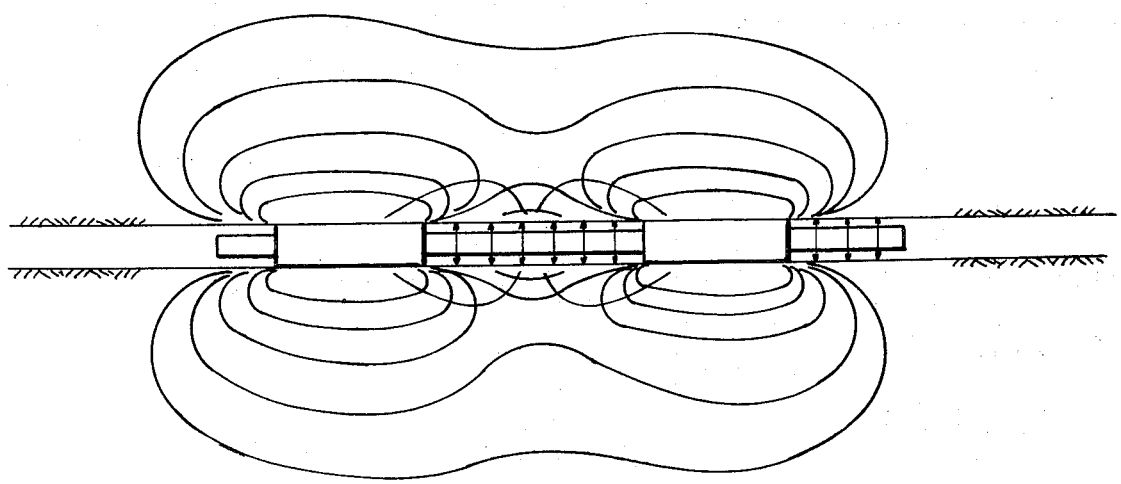
FIG_10

BOREHOLE STRESS-PROPERTY MEASURING SYSTEM

BACKGROUND OF THE INVENTION

Accurate measurement of the in situ stress states and material properties of ground media is the most fundamental requirement for quantitative analysis and sound design of ground structures such as dams, foundations, slopes, tunnels and underground mines. The engineering design of these ground structures is not based on the actual stress states nor accurately determined material properties of the grounds involved because there is currently no apparatus or system available for efficient and accurate determination of the stress states and material properties. As a result, engineering designs are usually based on an assumed stress state and approximated material properties, which assumption and approximation comprise the main inadequacy of current engineering practice on design and analysis of the ground structures.

Numerous methods have been developed and tried in the past to determine the in situ stress state in a ground medium, generally consisting of five separate fundamental steps to measure a stress state in a given point in the medium. First, a deformation gage, generally a borehole diameter gage, is placed on or in the ground media for which the stress is to be determined. Second, a change of the ground loading condition is introduced by means of additional cutting near the ground such as overcoring, advance coring and slot cutting, and the deformation caused by said cutting is measured by said deformation gage. Third, a specimen of the ground medium of which the measurement is being made is taken, usually in the form of core samples. Fourth, laboratory testing of said core samples is conducted to determine property coefficients of the material under various triaxial loading conditions. This is a laborious time-consuming task requiring a number of specimens for a given material from one test site. Fifth, by using the coefficients thus determined in a laboratory, the stress condition is calculated from the deformation caused by the applied loading.

The above five-step method has been found to be not sufficiently accurate for many engineering applications, in spite of the extensive work requirement, because the core samples are often disturbed in the process of coring, transporting, storing and the machining required prior to the laboratory testing and, therefore, the core sample as it exists in the laboratory is not representative of the medium in its natural state underground. In fact, in many natural ground media, such as soils and fractured rocks, a sampling of an undisturbed specimen is an impossible task. Furthermore, discontinuities and isotropy which are often encountered in underground media cannot be evaluated effectively in the conventional stress measuring method.

It is, therefore, a purpose of this invention to provide a system which will accomplish the simultaneous measurement of the in situ stress state and the in situ material properties in a ground medium in one in situ measurement in a single borehole without the need for additional field cutting and/or laboratory testing, and which is applicable for the measurement of a wide range of underground media ranging from soft clays to hard rocks.

It is a further purpose of this invention to provide a method and apparatus which can detect in situ the existence of discontinuities and anisotropy in underground media.

THE DRAWINGS

FIG. 1 is a front elevational view of the apparatus of the present invention as installed in situ in a test borehole;

FIG. 2 is an end view of the apparatus as represented in FIG. 1;

FIG. 3 is a diagrammatic representation of the borehole deformation and the stress contour envelopes created during the application of pressure to the apparatus;

FIG. 4 is an enlarged front cross-sectional view of a portion of the pressurizable chamber and illustrating one of the transducers;

FIG. 5 is a cross-sectional view taken along 5—5 of FIG. 4;

FIG. 6 is another front cross-sectional view illustrating the partition separating the pressurizable chamber from the non-pressurizable chamber;

FIGS. 7 through 9 are diagrammatic representations of borehole deformations in different axial positions of the apparatus in a bore-hole adjacent a discontinuity; and FIG. 10 is a diagrammatic representation of another embodiment of the invention.

DESCRIPTION OF THE PREFERRED EMBODIMENT

Referring to FIGS. 1 and 2, the measuring device of the present invention, generally designated by the numeral 2, is inserted axially along and into a test borehole 4 cut into the underground medium 5 to be evaluated. In FIG. 1, the direction of insertion is from left to right into the borehole, with a non-pressurizable cylindrical chamber 6 of the device preceding a pressurizable cylindrical chamber 8 into the borehole. Both chambers 6 and 8 are provided with a plurality of sets of a number of diameter measuring transducers, which are spaced along the respective cylindrical axes of chambers 6 and 8, and oriented in a common diameter direction perpendicular thereto, and which are adapted to respond to diameter changes in the borehole 4 in a transaxial direction within the borehole. Shown in FIG. 1 is a system equipped with two mutually perpendicular sets of the transducers. Although these two sets are sufficient in a uniform ground where the principal stress directions are known, a general case requires at least three sets in three different diameter-axis planes respectively. A system with more than three sets of the transducers is needed in grounds where the material properties are non-uniform and anisotropic. In general, the greater the number of the sets, the greater the accuracy of the measured results. Pressurizable chamber 8, designed to exert controlled variable fluid pressure against the borehole wall 14, is mounted in fixed spatial relationship to non-pressurizable chamber 6 along a common cylindrical axis 16 which is generally the central cylindrical axis of the borehole 4. Non-pressurizable chamber 6 is effectively insulated from the fluid pressure of pressurizable chamber 8 by a separating wall arrangement, the detail of which is best shown in FIG. 6. Fluid pressure in pressurizable chamber 8 is controllable by conventional remote reservoir and pump devices (not shown) connected to chamber 8 by a conduit 18.

Details of the mounting of the diameter measuring transducers 10 are generally represented in FIGS. 4 and 5 illustrating an embodiment employing a standard linear variable displacement transformer (LVDT) 20 mounted in the pressurizable chamber 8 to measure borehole diameter changes. The LVDT 20 is mounted freely slidably in a hole bored transversely diametrically through a steel cylinder 24 which forms the basic structural member of the pressurizable chamber. Two diametrically movable parts of the LVDT, magnet 21 and solenoid 22, are fastened separately to end pads 25 and 26 which are mounted to metal sleeves 27 and 28 respectively. The sleeves are bonded to expandable jacket 34 so that said pads may respectively move, by regulation of the liquid pressure, in directions parallel to the major cylindrical axis of the LVDT, as indicated by arrows $a$ and $b$. The modulated electrical signal output from the LVDT, calibratable to borehole diameter changes, is fed to appropriate remote metering devices by a multiple wire conduit 30 which extends from the LVDT through the central primary bore 32 of the pressurizable chamber 8 to the remote station via the fluid conduit 18.

With further reference to FIGS. 4 and 5, the structure of the pressurized chamber 8 is basically as follows. The basic structural member is a steel cylindrical tube 24 with an inner primary cavity bore 32 which receives controllable fluid pressure via the aforementioned fluid conduit 18. A semi-rigid, expandable rubberized envelope jacket 34 is disposed in spaced relation to tube 24 and defines an annular cavity 36 therebetween. In operation, the outer surface 38 of jacket 34 will be contiguously disposed to inner surface 14 of borehole 4. Fluid transfer passages 40 extend radially through inner tube 24 so as to transfer fluid pressure from primary cavity 32 to secondary annular cavity 36, thereby applying said pressure to borehole surface 14 via the expandable jacket 34.

Non-pressurizable chamber 6, as generally shown on the right in FIG. 6, includes a rigid cylindrical housing 41 defining an inner chamber 43 for receiving the necessary electrical leads. A plurality of LVDTs extend diametrically through the housing in the same manner as such transducers extend through the construction of chamber 8. It will be understood that the chamber 43 may be open to the atmosphere or submerged in water or some borehole fluid but is not intended to receive any internal fluid pressure from the pressurizable chamber. In operation, the patterns of diameter changes are obtained in relation to the fluid pressure of the pressurizable chamber as a function of the time of loading and unloading as follows. The pressure level in the pressurized chamber is gradually raised by repeating load-unload cycles until the applied pressure level exceeds the sum of the in situ earth pressure and strength of the ground medium. The excess pressure thus applied will destroy the borehole. Borehole deformations observed throughout the entire loading process up to failure point disclose the total spectrum of the ground medium behavior including initial consolidation, elastic and non-elastic deformation, yield, fracture, viscoelastic deformation, plastic flow and final failure. During the test process, borehole diameter changes are measured accurately across the partition wall (dividing cylinders 6 and 8 from each other) at the various locations determined by the LVDTs in the pressurizable and non-pressurizable chambers in relation to the loading pressure levels. The end result is a set of in situ simultaneous data, including the loading, pressure, deformation with respect to time in the pressurized and non-pressurized sections of the borehole, providing information sufficient and necessary for computing the stress state condition and material structural properties of the ground, such as elasticity, viscoelasticity, viscoplasticity, compressibility, yield and failure strengths.

Reference to FIG. 3 will assist in conceptual understanding of the principle of operation of the system of this invention. Inserted into borehole 4 are pressurizable chamber 8 and non-pressurizable chamber 6. Chamber 6 is preferably connected to cylinder 8 such as by internal threads provided at an end of housing 41 engaging external threads provided on an extension 45 provided on chamber 8. The expandable jacket of chamber 8 will be in contact with a portion of borehole surface 14. Once chamber 8 is pressurized to a pressure represented by arrows $c$, the stress develops in the surrounding ground as indicated by stress contour envelopes, represented by arrows $d$. Then, the ground moves in perpendicular to the envelopes as indicated by curves $e$. The ground movement results in the borehole deformation so that borehole diameter deformation profiles 42 and 44 develop. These profiles are measured by the LVDTs positioned along both the pressurized chamber 8 and the non-pressurized chamber 6 in a number of transaxial directions. It is noted that the borehole diameter deformation will be positive along the extent of the pressurized region, and will actually become negative outside of the region with a relatively large magnitude of the deformation for an extent of approximately one or two diameters along the borehole, beyond which distance the deformation vanishes rapidly. While deformation will be measured generally along the total extent of both the pressurizable and non-pressurizable cylinders, it is important that the disposition of the LVDTs on the non-pressurizable chamber is started immediately next to the separating wall between the pressurizable and non-pressurizable chambers. The distance between the separating wall and the first LVDT transducer, represented as dimension $L_c$ in FIG. 3, must be kept as close to zero as possible so as to permit a reading of sharply varying borehole diameter change to be made in the nonpressurized section of the borehole as close as possible to the separation wall which represents the transition plane from positive pressure to zero pressure exerted in the borehole. The closer this dimension approaches zero, the more accurate will be the data obtained from the test, and the more closely will the calculated material coefficients approach true in situ coefficients.

FIG. 6 illustrates internal detail of the partition wall between the pressurizable and non-pressurizable chambers 8 and 6 which is especially designed for minimizing the $L_c$ value. Forming the principal structural member of the pressurizable section 8 is the cylindrical tube 46 preferably constructed of high strength steel to withstand fluid pressure of up to 50,000 psi which will be required to perform analysis of hardest rock media. At one axial extremity of said tube 46 is formed a flange-like projection 48 which constitutes the partition wall per se between the cylinders. Machined axially into said projection 48 are a plurality of conductor grooves 50 through which are passed individual output wire leads 52 of the individual LVDTs positioned in the non-pressurizable section 6. In this preferred embodiment of the instant invention, pressure leakage through the conductor grooves 50 is prevented by encapsulating wire leads 52 with a bi-compositional plug composed of a hard epoxy cement element 54 and a soft epoxy cement element 56. Enveloping the pressurizable cylinder 8 is the rubber or plastic composition jacket 34 into which is molded a cylindrical brush of fine, free-ended parallel piano wires 58 crimped upwardly, inwardly, and backwardly at the two lateral ends of the pressurized chamber. This composite rubber/wire brush arrangement serves the following functions in the instant device. First, it secures the cylinder 8 in position by the friction developed between the expandable jacket and the borehole surface. Second, it pressure-seals the space between the outside diameter of the expandable jacket and the borehole wall through the flexibility the resiliency of the composite rubber/wire jacket. (Note that an additional sealing wedge, not shown, could be employed to fit a larger borehole.) Third, it insulates the diameter-measuring transducers from internal axial tension, as the wires themselves, rather than the rubber which surrounds the transducers, will carry most of the shearing stresses. Fourth, it reinforces the rubber jacket against cracking, splitting, etc.

Another embodiment of the system of this invention, diagrammatically illustrated in FIG. 10, is that of employing two sets of pressurizable and non-pressurizable cylinders in series in the borehole. Such an arrangement will permit more accurate measurements to be taken because the magnitude of all borehole diameter deformations will be correspondingly increased, thereby improving transducer performance and response as well as increasing the total volume of surrounding ground media involved in a single testing.

It is also noted that the system of the instant invention is capable of analyzing both anisotropy and discontinuity of in situ stress state and material properties as diagrammatically illustrated in FIGS. 7, 8 and 9. These figures illustrate diameter change distribution curves plotted vertically against borehole depth. Line *t-t* in each figure represents a discontinuity plane between relatively soft ground on the left and relatively hard ground on the right. In FIG. 7, the device of this invention lies entirely to the left of the discontinuity. In FIG. 8 the device straddles the discontinuity. And, in FIG. 9, the device lies entirely to the right of the discontinuity. By incrementally advancing the device into borehole sections of suspected discontinuity, the existence or non-existence of the discontinuity, as well as its location, can be ascertained merely by inspection of the resultant data from the LVDTs. Further, the bonding properties of the discontinuity contact surfaces can be accurately calculated from the diameter deformation data in the same manner described above for determining in situ material properties of continuous media.

I claim:

1. A method of analyzing stress states and material properties of ground media surrounding a borehole which consists of applying radially outward pressure to said borehole only along a first portion of the length thereof, positioning a plurality of transducers in said borehole transaxially of the length thereof in said first portion of the borehole and in a second portion of the length of said borehole adjacent said first portion, and measuring the radial deformation of said borehole in said first and second portions.

2. The method of claim 1 in which said transducers lie in a plurality of diameter-axis planes in each of which a set of a number of said transducers are disposed to observe the distribution curve of the diameter change along the borehole axis.

3. The method of claim 1 in which said pressure is incrementally increased, and said measurements are taken during successive incremental increases in pressure with respect to time of the pressurizing.

4. The method as set forth in claim 1 in which said pressure is applied to said borehole substantially uniformly along said first portion while not permitting any such pressure to be applied along said second portion.

5. The method Of claim 4 in which said transducers are closely disposed in said borehole in said second portion starting immediately next to said first portion at an axial distance from said first portion no greater than twice the diameter of said borehole, so that the most critically changing portion of the diameter change distribution curve lies within the distance from the juncture of said portion twice the diameter of said borehole as observed in the individual diameter-axis planes.

6. Apparatus for analyzing stress states and material properties of ground media surrounding a borehole, comprising a first tubular member and an axially aligned second tubular member, said first member having a radially expandable outer portion, means for selectively expanding said portion, a plurality of transaxially disposed length-measuring devices carried by said first and second members and normally extending beyond the outer surfaces thereof, each said length-measuring device measuring the diameter of said borehole at the location of each said device.

7. Apparatus as set forth in claim 6 in which said length-measuring devices comprise transducers spaced axially of each of said members.

8. Apparatus as set forth in claim 7 in which said transducers are disposed in a common transaxial direction in a plurality of diameter-axis planes.

9. Apparatus as set forth in claim 7 in which said transducers have electrical leads extending through said first member, said first member having a pressure chamber therein, and means sealing said first member from said second member.

10. Apparatus as set forth in claim 7 in which said transducers comprise linear variable displacement transformers.

11. Apparatus as set forth in claim 6 in which said first and second members are secured together, and said first member has an inner fluid pressure chamber therein for expanding said expandable outer portion.

12. Apparatus as set forth in claim 11 in which said first chamber is substantially sealed by a partition wall which enables fluid pressure to be exerted on the surface of said borehole up to the extent of the first chamber and, at the same time, enables the said length-measuring devices of the second chamber to be disposed substantially immediately next to the limit of pressurization.

* * * * *